United States Patent
Karsch et al.

(10) Patent No.: US 10,094,260 B2
(45) Date of Patent: Oct. 9, 2018

(54) MULTI-CHAMBER CONTAINER

(71) Applicant: KAUTEX TEXTRON GMBH & CO. KG, Bonn (DE)

(72) Inventors: Ulrich Karsch, Niederkassel (DE); Agnes Eberhardt, Bonn (DE); Brent Jerome Williams, Troy, MI (US)

(73) Assignee: KAUTEX TEXTRON GMBH & CO. KG (DE)

( * ) Notice: Subject to any disclaimer, the term of this patent is extended or adjusted under 35 U.S.C. 154(b) by 0 days.

(21) Appl. No.: 15/121,694

(22) PCT Filed: Feb. 20, 2015

(86) PCT No.: PCT/EP2015/053571
§ 371 (c)(1),
(2) Date: Aug. 25, 2016

(87) PCT Pub. No.: WO2015/128249
PCT Pub. Date: Sep. 3, 2015

(65) Prior Publication Data
US 2016/0363025 A1    Dec. 15, 2016

(30) Foreign Application Priority Data
Feb. 28, 2014  (DE) .................. 10 2014 002 688

(51) Int. Cl.
*B65D 88/12* (2006.01)
*F01N 3/20* (2006.01)
(Continued)

(52) U.S. Cl.
CPC ............ *F01N 3/2066* (2013.01); *B60K 11/02* (2013.01); *B60K 15/03* (2013.01);
(Continued)

(58) Field of Classification Search
CPC .............. B60K 15/03; B60K 15/03006; B60K 15/03177; B60K 2015/03118; B60K 2015/03164
(Continued)

(56) References Cited

U.S. PATENT DOCUMENTS 3,343,746 A * 9/1967 Shiffman ........... B65D 21/0227
206/503
2004/0142232 A1* 7/2004 Risca ................. B60H 1/00514
429/100
(Continued)

FOREIGN PATENT DOCUMENTS

DE          8914557 U1     3/1990
DE     102005029415 A1    12/2006
(Continued)

OTHER PUBLICATIONS

International Search Report (in English and German) and Written Opinion (in German) for PCT/EP2015/053571, dated Jul. 20, 2015; ISA/EP.

*Primary Examiner* — Steven A. Reynolds
*Assistant Examiner* — Javier A Pagan
(74) *Attorney, Agent, or Firm* — Harness, Dickey & Pierce, P.L.C.

(57) ABSTRACT

The disclosure relates to a multi-chamber container made of thermoplastic plastic as a service-fluid container for a motor vehicle, which multi-chamber container comprises at least two chambers, which constitute separated volumes that are not in fluid connection with each other, at least not directly, and which are each designed to hold a different service fluid, wherein at least two surrounding walls of the chambers adjoin each other, the chambers are components of a continuous container body combination, the surrounding walls of at least two chambers that adjoin each other are connected to each other in a bonded manner by means of at least one (Continued)

Figure 2:
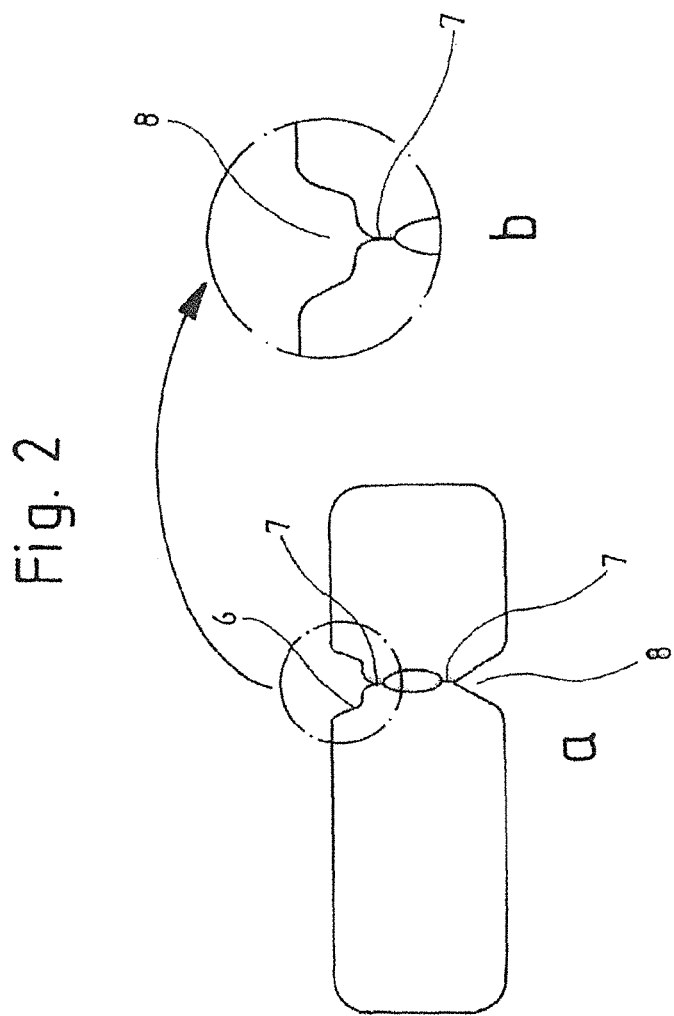

material bridge or in a form-closed manner and/or by means of fasteners, and the connection is designed to independently release under the influence of deformation forces caused by impact such that the container body combination is divided into at least two separate container body parts or two container bodies under the influence of deformation forces caused by impact.

9 Claims, 4 Drawing Sheets

(51) Int. Cl.
  B60S 1/50    (2006.01)
  B60K 11/02   (2006.01)
  B60K 15/03   (2006.01)
  B60K 13/04   (2006.01)

(52) U.S. Cl.
  CPC .. *B60K 15/03006* (2013.01); *B60K 15/03177* (2013.01); *B60S 1/50* (2013.01); *B60K 13/04* (2013.01); *B60K 2015/03118* (2013.01); *B60K 2015/03151* (2013.01); *B60K 2015/03309* (2013.01); *B60K 2015/03348* (2013.01); *B60K 2015/03453* (2013.01); *B60K 2015/03493* (2013.01); *B60Y 2306/01* (2013.01); *F01N 2610/1406* (2013.01); *Y02A 50/2325* (2018.01); *Y02T 10/24* (2013.01)

(58) Field of Classification Search
  USPC .................................................. 220/562, 564
  See application file for complete search history.

(56) References Cited

U.S. PATENT DOCUMENTS

| 2009/0159483 | A1* | 6/2009 | Hinze | ............... | B65D 75/327 |
| | | | | | 206/548 |
| 2009/0235687 | A1* | 9/2009 | Dren | .................. | F25D 17/065 |
| | | | | | 62/441 |
| 2010/0282758 | A1* | 11/2010 | Gaden | ................ | B60K 15/03 |
| | | | | | 220/565 |

FOREIGN PATENT DOCUMENTS

| DE | 19644464 B4 | 6/2007 |
| DE | 102009009676 A1 | 8/2010 |
| DE | 102010019423 A1 | 1/2011 |
| EP | 0882177 B1 | 10/2006 |
| WO | WO-2010066184 A1 | 6/2010 |
| WO | WO-2011022578 A2 | 2/2011 |
| WO | WO-2014094919 A1 | 6/2014 |

* cited by examiner

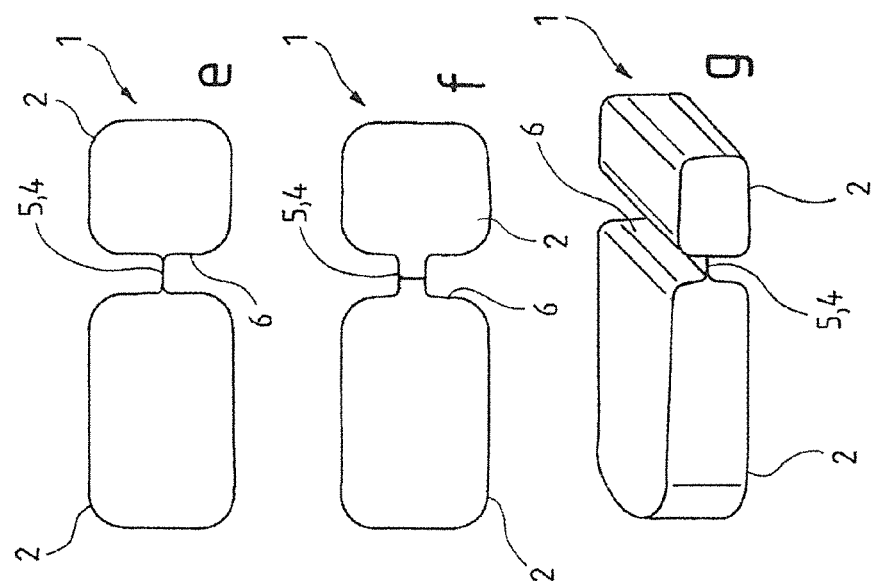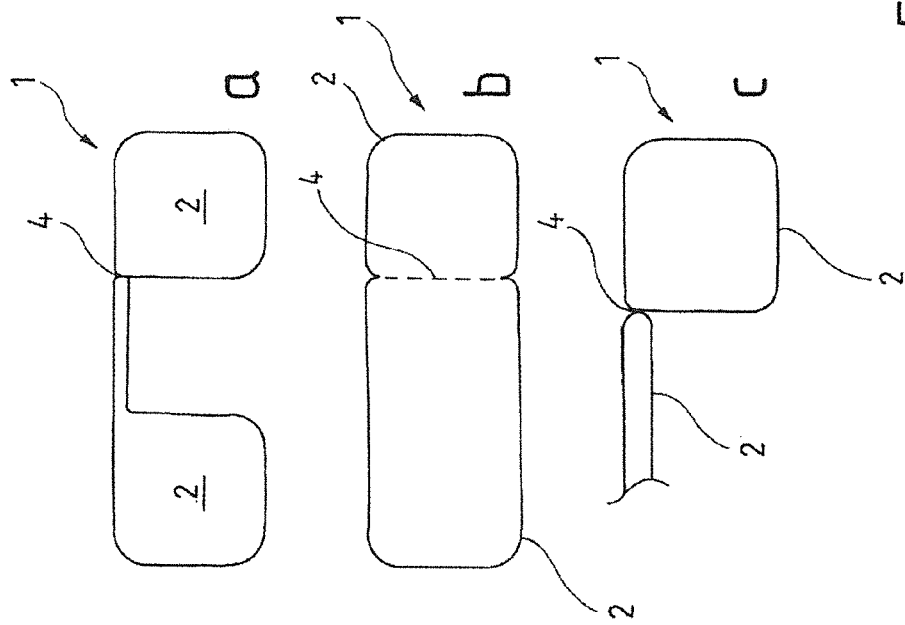
Fig. 1

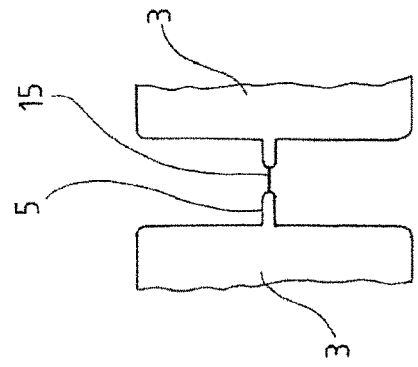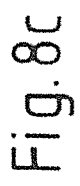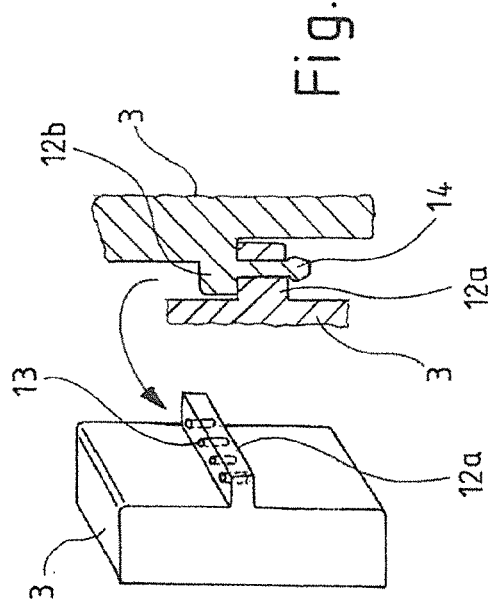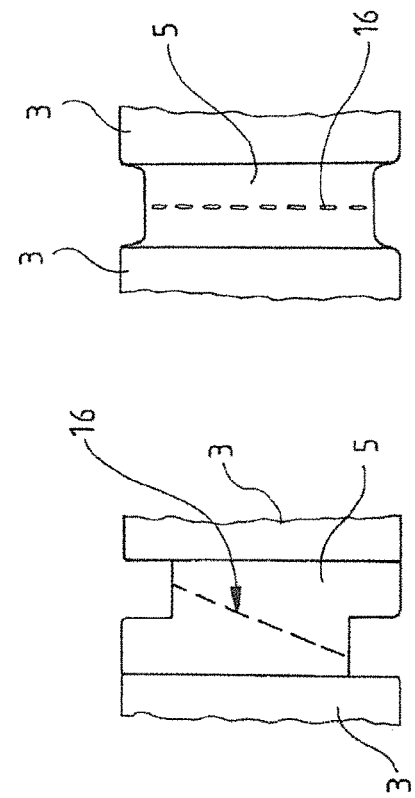

MULTI-CHAMBER CONTAINER

CROSS-REFERENCE TO RELATED APPLICATIONS

This application is a 371 U.S. National Stage of International Application No. PCT/EP2015/053571, filed on Feb. 20, 2015, which claims priority to German Application No. 10 2014 002 688.4, filed on Feb. 28, 2014. The entire disclosures of the above applications are incorporated herein by reference.

FIELD

The disclosure relates to a multi-chamber container of plastics material, preferably of thermoplastic plastics material, acting as an operating fluid container for a motor vehicle, which comprises at least two chambers which are constructed as separate part-volumes. Such multi-chamber containers are in principle known from the prior art, for example, from DE 196 44 464 B4.

BACKGROUND

This section provides background information related to the present disclosure which is not necessarily prior art.

DE 196 44 464 relates to a fuel container for a motor vehicle, having components for transporting fuel and for preparing fuel and having an additional container which is secured outside the fuel container to a housing wall of the fuel container, wherein in the fuel container and in the additional container at least one opening is formed in each case and the openings are connected to each other by means of at least one seal and wherein the components which are required for the fuel transport and the fuel preparation are arranged in the additional container. With this arrangement of the container chambers, a significant aspect is the replaceability of the additional container in the event of repair.

The two part-volumes which are formed by the main container and the additional container communicate with each other via a common container opening, in the region of this opening the containers are, for example, connected to each other by means of a bayonet type closure which can be released if necessary and which at the same time provides the required retention and sealing force.

In addition to such a container arrangement, multi-chamber tanks are also known in which a plurality of chambers are arranged inside a housing which collectively surrounds the chambers.

There is known, for example, from EP 0 882 177 B1 a ventilator housing for a motor vehicle which is constructed integrally from thermoplastic plastics material and which is constructed as a combination container for coolant and washing water. The housing is subdivided into different chambers by means of contracted intermediate walls or squeezed regions of the common housing body. In particular as a result of the contractions and the intermediate walls, the entire container arrangement becomes relatively stiff so that, in the case of forces acting as a result of an impact, a formation of cracks in intermediate walls or even in the housing wall which surrounds the chambers cannot be eliminated.

SUMMARY

This section provides a general summary of the disclosure, and is not a comprehensive disclosure of its full scope or all of its features.

An object of the disclosure is therefore to provide a multi-chamber container which in particular complies with increased safety requirements in the event of forces acting as a result of an accident.

According to one aspect of the disclosure, a multi-chamber container of plastics material is provided, preferably of thermoplastic plastics material, acting as an operating fluid container for a motor vehicle, which comprises at least two chambers which as separate volumes are at least not directly in fluid connection with each other and which are each constructed to receive a different operating fluid selected from a group comprising fuel, lubricant, coolant, cleaning fluid, reducing agent for the exhaust gas denitrification or fuel additive, wherein at least two surrounding walls of the chambers adjoin each other, the chambers are a component of a coherent container body assembly, the surrounding walls of at least two mutually adjacent chambers are connected to each other in a materially integral manner by means of at least one material bridge or in a positive-locking manner by securing means and wherein the connection is constructed to be self-releasing under the action of deformation forces resulting from an impact so that the container body assembly under the action of deformation forces resulting from an impact is divided into at least two separate container body portions or two container bodies.

The chambers of the multi-chamber container in the context of the present disclosure are not in fluid connection with each other in the sense that each of the chambers forms a self-contained volume so that, in the event of a separation of the container body assembly into two or more separate container body portions, where applicable each of the container body portions remains intact and no fluid escapes.

A container body assembly in the context of the present disclosure is intended to be understood to be a coherent arrangement of chambers which forms a structural assembly at least in the installation location in accordance with provisions.

A materially integral connection in the context of the disclosure comprises a weld connection, an adhesive bonding connection and a connection which is in the narrowest sense integral, that is to say, monolithic.

A positive-locking connection in the context of the disclosure may be intended to be understood to be a catch connection, snap-fitting connection, a bayonet connection or a plug type connection using additional plug type connection elements, such as, for example, bolts, studs or the like.

A multi-chamber container according to the present disclosure may, for example, comprise a fuel volume and a cleaning fluid volume and/or a volume for an additive for exhaust gas denitrification (reducing agent). In this instance, there may be provision, for example, for one or more chambers for auxiliary fluids, such as, for example, lubricants, coolants, cleaning fluid or reducing agent, to be arranged so as to extend around a chamber which is provided to receive fuel so that the chamber which is constructed as a volume for receiving fuel is protected against forces resulting from an impact by one or more chambers which are provided to receive auxiliary fluids. Those chambers which are provided to receive an auxiliary fluid may, for example, be arranged in the installation position in the motor vehicle in such a manner that they are arranged in the direction toward the anticipated impact in front of the chamber which is constructed as a volume for receiving fuel.

In the event of an impact, the container body assembly will become disengaged under the action of deformation forces, the deformation forces acting on the multi-chamber container are thereby advantageously used up so that the pressure acting on the surrounding walls of the chamber is accordingly reduced and the sealing of the individual chambers remains ensured. A failure of the container body arrangement in the sense that the individual container body components become disengaged from each other is in this regard less critical than a failure of the individual container body portions.

A multi-chamber container of the above-mentioned type may in particular also be composed of container body portions of different materials. For example, for fuel containers there are different safety requirements in the motor vehicle from those for additive containers or washing water containers which may comprise either more brittle or thinner-walled container bodies. In this instance, the more brittle or thinner-walled container body in the direction of an anticipated impact may be arranged upstream of the thicker-walled or more resilient container body in such a manner that the more brittle container body or thinner-walled container body is sacrificed in the event of an impact in the sense that the destruction thereof brings about a consumption of the forces resulting from the impact. It may provide a protective function for the less fragile container bodies in the manner of a protective cushion or protective upholstery. The less fragile container body may in the event of such a configuration be constructed to receive fuel or lubricant, whereas the more fragile container body is constructed to receive an operating fluid, which is less critical with regard to the environmental hazard thereof.

Finally, for fuel containers a high level of impermeability is required so that, for example, a container body portion of the multi-chamber container may be constructed from a co-extruded multi-layer thermoplastic plastics material with barrier layers for hydrocarbons, whereas another container body portion may comprise an extrusion blow-molded single-layer thermoplastic plastics material.

In a preferred variant of the multi-chamber container according to the disclosure, there is provision for the container body assembly to comprise at least two container body portions which are integrally connected to each other and which are connected to each other along a desired breaking line.

The container bodies may, for example, be connected to each other by means of at least one material bridge which is provided with at least one perforation line.

Alternatively, a thin location or fold in a material bridge between container body portions which are connected to each other may be provided as a desired breaking line.

Finally, there may be provision for the container body portions to be connected to each other by means of at least one material bridge which is constructed as a film-like hinge.

According to another variant of the multi-chamber container according to the disclosure, the container bodies may be connected to each other by means of at least one material bridge which comprises a brittle-hard material which preferably has a greater elasticity modulus than the material of at least one of the individual container body portions. With some or all of the variants of the multi-chamber container according to the disclosure described above, the container body portions may be integrally connected to each other in the sense that they comprise a monolithic material assembly.

The multi-chamber container according to the disclosure may have been obtained, for example, by means of injection-molding, deep-drawing, rotational sintering, extrusion blow-molding or other production methods.

As an alternative to such an integral construction of the multi-chamber container according to the disclosure, there may be provision for the container body assembly to be composed in several parts from two or more container bodies.

In this instance, it is advantageous for the container bodies to be engaged with each other in a positive-locking manner so as to be able to be forcibly detached. The term "in a positive-locking manner so as to be able to be forcibly detached" in the context of the disclosure means that, although the container bodies which form the container body assembly engage one inside the other in a positive-locking manner, the dimensions of the contours which engage inside each other are selected in such a manner that, by virtue of the resilience of the portions of the container bodies which engage one inside the other, they can be released from each other with mutual plastic deformation of the material. It is thus possible, for example, with a dovetail profile, to select the dimensions of the undercut of the groove and the complementary contour of the respective rib in such a manner that, when applying a deformation force which exceeds a specific magnitude, a resilient deformation of both contours which engage one inside the other takes place and enables the engagement to be released.

In principle, there may also be provision for at least one container body to have at least one undercut groove profile which cooperates in a positive-locking manner with a complementary rib profile of the adjacent container body. The cooperating profiles, in this instance the groove profile and the rib profile, may each be arranged in a linear manner, but the geometry of the extent of the respective profiles on the container body is not critical for the disclosure.

For example, there may also be provision for at least one container body to have at least one, preferably a plurality of locking studs, wherein the locking stud cooperates in the manner of a push-button connection with a stud receiving member which is constructed as a blind hole. The locking stud and the stud receiving member may have a cross-section profile which is comparable with the groove profile and the complementary rib profile. The locking stud may, for example, be constructed as a fir-tree-like profile with one or more peripheral ribs; the blind hole may have a corresponding inner contour.

In a variant of the multi-chamber container according to the disclosure which is also advantageous, there is provision for the groove profile to be constructed as a dovetail profile or cross-shaped profile or C-shaped profile with profile members which are constructed in a hook-like manner.

In an alternative embodiment of the multi-chamber container according to the disclosure, there may be provision for the container bodies to be connected to each other by means of at least one stud or at least one alignment pin, wherein the stud or alignment pin extends through at least one hole of at least one container body and wherein the stud or alignment pin has a desired breaking location. Of course, the container bodies can be connected to each other by means of a large number of studs or alignment pins along one or more sides.

Alternatively, the container bodies may be connected to each other, for example, by means of a sliding closure.

In an advantageous variant of the multi-chamber container according to the disclosure, there is provision for at least one of the container bodies to have a securing flange which is provided with a large number of holes and for at least one other body of the container bodies to have a large number of integrally formed studs which engage in the holes of the securing flange.

In another variant of the multi-chamber container according to the disclosure, there may be provision for each container body to have a securing flange, for each securing flange to be provided with a large number of holes and for the securing flanges in the container body arrangement to be arranged one above the other in the installation position in such a manner that the holes of the flanges are orientated in alignment with each other and receive alignment pins or studs which have been inserted therein as separate components and which either comprise a material which has a low shearing resistance or are provided with corresponding desired breaking locations.

DRAWINGS

The drawings described herein are for illustrative purposes only of selected embodiments and not all possible implementations, and are not intended to limit the scope of the present disclosure.

The disclosure is explained below with reference to an embodiment illustrated in the drawings, in which:

FIGS. 1a to 1g: show a multi-chamber container according to the disclosure which is constructed from a coherent container body assembly, wherein mutually adjacent chambers are connected to each other by means of at least one material bridge, FIG. 2: shows a variant of the multi-chamber container according to the disclosure, in which a container body assembly is formed by means of two materially integral container bodies, FIGS. 3 to 6: show different variants of a multi-chamber container according to the disclosure, which is composed of two container bodies which form a container body assembly which is assembled in a positive-locking manner, FIG. 7: shows a variant of the multi-chamber container according to the disclosure in which two container bodies are connected to each other in a positive-locking manner by means of shear bolts or shear studs, and FIGS. 8a to 8c: show variants of a multi-chamber container according to the disclosure which comprises two container body portions which are connected to each other in an integral manner and which are connected to each other by means of a material bridge having a desired breaking line.

DETAILED DESCRIPTION

Example embodiments will now be described more fully with reference to the accompanying drawings.

The multi-chamber container 1 according to the disclosure comprises two or more container body portions 2 (see, for example, FIGS. 1a to g) or two or more separate container bodies 3 which each form a container body assembly.

Each container body 3 or each container body portion 2 defines at least one chamber which defines a substantially self-contained volume.

When container body portions 2 are mentioned below, this is intended to refer to container body portions which form a substantially integral container body assembly. According to the system of the present patent application, a distinction is made between a plurality of container bodies which are completely separated and which are assembled in a positive-locking manner to form a container body assembly.

All the embodiments of the multi-chamber container according to the disclosure have in common the fact that the container body portions or the container bodies under the action of deformation forces resulting from an impact are separated or broken up into two separate container body portions 2 or container bodies 3.

FIG. 1a is, for example, a highly simplified view of a multi-chamber container 1 according to the disclosure which integrally comprises two container body portions 2. The geometric arrangement of the container body portions 2 with respect to each other is selected in the manner of a saddle tank, but, in the context of the disclosure, other configurations of container body portions 2 which are arranged with respect to each other are also conceivable. For example, individual container body portions 2 may be constructed in the manner of a torus or circle segment and surround each other concentrically.

In the cases of FIGS. 1a to 1c, the individual container body portions 2 are connected to each other by means of a desired breaking line 4, wherein FIGS. 1a to 1c show different views of a concept of a multi-chamber container 1. Both container body portions 2 are connected to each other in one piece in the sense of integrally along the desired breaking line 4. Both container body portions 2 may have been obtained in one operation step, for example, by means of extrusion blow molding in a common tool, wherein the container body portions 2 are at least not directly in fluid connection with each other, that is to say that both container body portions 2 are constructed as self-contained volumes which can each receive different media. For example, the larger container body portion may be constructed as a fuel container, whereas the smaller container body portion 2 may be constructed as an additive container, for example, for a coolant, a cleaning fluid, a reducing agent for the exhaust gas denitrification or the like. The term "self-contained" according to the disclosure does not exclude means for reventilation and ventilation of the volumes and means for removing fluid and/or means for filling the volumes from being provided.

Any necessary fitted components, connections or similar functional elements of the individual container body portions 2 are not illustrated for reasons of simplification.

The connection line between the container body portions 2 which is constructed as a desired breaking line 4 may have been obtained, for example, by a corresponding squeezing of the preform during the extrusion blow molding operation in the blow molding tool. The desired breaking line 4 is in this instance selected by the material thickness in such a manner that the container body portions 2, under the action of external forces, for example, under the action of bending forces or impacts, may become disengaged from each other, wherein each of the container body portions 2 is intended to remain intact to the greatest possible extent.

The desired breaking line 4 may, for example be constructed as a perforation line with a large number of perforations, but a construction in the manner of a film-like hinge, that is to say, only as a weakening line, is also conceivable.

In the case of the embodiment according to FIGS. 1a to 1c, the connection of the container body portions 2 is geometrically produced in such a manner that, for example, in the event of a side impact by means of at least one of the container body portions 2 a high bending torque is introduced into the desired breaking line 4 and leads to the connection being broken.

As already mentioned, the multi-chamber container 1 may, for example, be constructed as a saddle tank, wherein each of the container body portions 2 defines a volume which is at least primarily arranged in each case beside an exhaust gas installation and/or a cardan transmission tunnel of a motor vehicle.

Another variant of the multi-chamber container 1 is, for example, illustrated in FIGS. 1e to g, in which the individual container body portions 2 are connected to each other by means of a material bridge 5 or a material web which forms a desired breaking line 4. The material bridge 5 also extends in the same manner as the desired breaking line 4 according to FIGS. 1a to 1c over the entire length of two mutually adjacent side walls 6 of the container body portions 2, wherein the material bridge 5 extends substantially centrally with respect to the height of the container body portions 2.

Another variant of the multi-chamber container 1 according to the disclosure is illustrated in FIG. 2. The multi-chamber container 1 according to FIG. 2 comprises two container body portions 2 which have subsequently been connected to each other in a materially integral manner, for example, by means of adhesive bonding or welding, along two joint seams 7 which are arranged one above the other and which also form desired breaking lines 4.

The adhesive bonding may, for example, have been carried out by means of an adhesive/bonding agent which forms a weakening line as a result of its elasticity modulus and the nature of the material thereof.

Alternatively, the joint seams 7 may have been produced by means of welding of the container body portions 2 along the joint seams 7.

According to a preferred variant of the multi-chamber container 1 according to the disclosure, the container body portions 2 or the container bodies 3 are constructed from thermoplastic plastics material, wherein such a material selection may be provided for all embodiments mentioned in the application.

In this instance, the welding of the container body portions 2 can be carried out without the assistance of additional material, for example, by means of mutual molecular permeation of the container body portions which have been softened at the relevant locations and which are then moved towards each other in the softened/plastic state with joining pressure being applied.

In the embodiment illustrated in FIG. 2, the side walls 6 of the container body portions 2 are preferably geometrically constructed in such a manner that they permit an introduction of bending forces into the joint seams 7, that is to say, corresponding bending paths are ensured. Thus, for example, with the multi-chamber container 1 according to FIG. 2, corresponding gussets 8 are provided above and below the joint seams 7 between the side walls 6 of the container body portions 2.

FIGS. 3 to 6 show additional variants of the multi-chamber container 1 according to the disclosure, wherein in each case two materially separate and where applicable materially different container bodies 3 are assembled with each other to form a container body assembly in a positive-locking manner.

In all embodiments, only two container bodies 3 or container body portions 2 are assembled with each other to form a container body assembly, but the disclosure is intended to be understood in such a manner that the multi-chamber container 1 according to the disclosure may also comprise a really complex container body arrangement of where applicable two container bodies 3 or container body portions 2.

Figure 3:
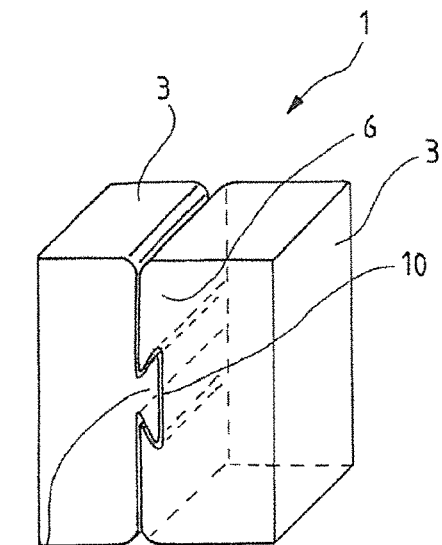

FIG. 3 shows, for example, two container bodies 3 which, as with all other embodiments, also define volumes which are completely separate from each other in fluid terms. A first container body 3 comprises on the side wall 6 thereof a rib 9 which extends over the length of the side wall 6 with a dovetail profile, the second container body 3 adjacent to the first container body 3 comprises a complementary groove 10 with corresponding undercuts. The groove 10 may be inserted or snap-fitted in the rib 9, the flanks of the groove 10 and the rib 9 are in any case intended to be dimensioned in such a manner that, under the action of bending forces or other deformation forces on the container body assembly, a forced detachment of the rib 9 from the groove can take place. Such a forced detachment is in particular possible when at least one container body 3 comprises a thermoplastic plastics material which has adequate resilience which ensures such forced detachability.

In principle, multi-chamber containers 1 according to the variants 3 to 6 may be constructed in such a manner that the container bodies 3 each comprise different materials, which takes into account potentially different contents of the volumes defined by the container bodies 3.

In an alternative variant of the container body assembly comprising a plurality of container bodies 3, there may, for example, also be provision for the rib 9 which is provided on a side wall 6 to be connected itself by means of one or more desired breaking lines to the respective side wall 6 so that under the action of forces, for example, the rib 9 could tear off and could remain in the groove 10. The person skilled in the art will recognize that to this end he must construct the rib 9 in such a manner that tearing the rib 9 away from the respective side wall 6 does not lead to damage to the side wall 6. The rib 9 may, for example, be adhesively bonded or welded to the side wall 6 of the container body 3. Such a variant is expedient and advantageous for all the construction variants illustrated in FIGS. 3 to 6.

Figure 4:
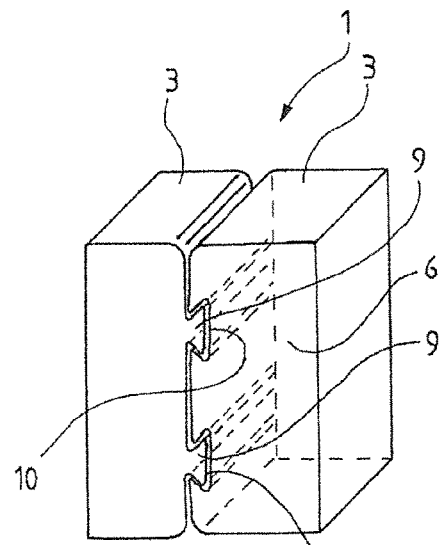

In the variant of the multi-chamber container 1 illustrated in FIG. 4, there are arranged along a container body 3 on a side wall 6 a plurality of ribs which each cooperate with a groove 10 in the side wall 6 of the other container body 3.

As already mentioned in the introduction, the planar/linear arrangement/extent of the profiles which engage inside each other on the side walls 6 of the container bodies 3 is not critical. Instead, individual studs and complementary blind holes or receiving members may also be provided in the side walls 6 of the container walls.

Figure 5:
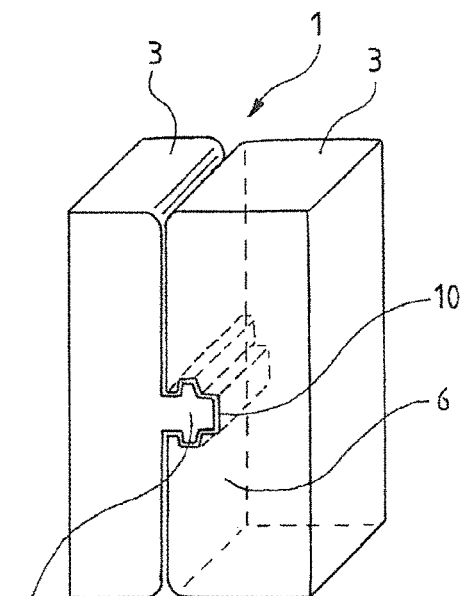
Figure 6:
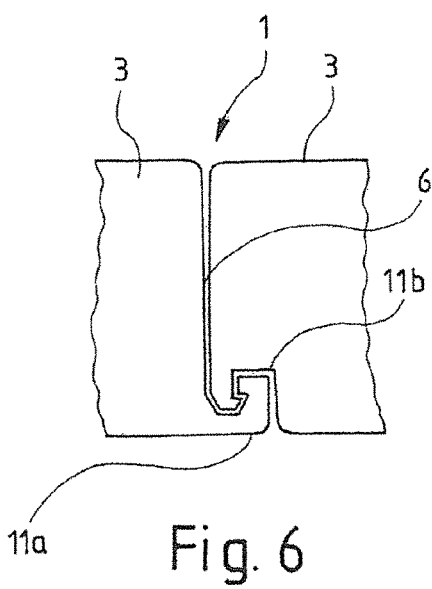

FIG. 5 shows a variant of the multi-chamber container 1, in which the rib 9 has a cross-shaped profile in cross-section; the complementary groove 10 has the same cross-shaped profile.

In the variant of the multi-chamber container 1 according to the disclosure, the side walls 6 of the container bodies 3 engage one in the other in the manner of a hinge. A first container body 3 comprises a substantially C-shaped rib profile 11a which engages in a correspondingly constructed groove profile 11b.

The rib profile 11a and the groove profile 11b are in each case arranged on a side wall 6 of the respective container body in such a manner that they extend in the region of a corner to an upper base or to a lower base of the respective container body 3. In this manner, it is ensured that when corresponding bending/deformation forces are introduced into the hinge formed by the rib profile 11a and the groove profile 11b, this hinge forms a desired breaking line between the container bodies 3.

Another variant of the multi-chamber container 1 according to the disclosure is illustrated in FIG. 7. The multi-chamber container 1 according to the embodiment according to FIG. 7 comprises two container bodies of which one container body comprises a bar 12a, 12b or a securing flange, wherein the bar 12a, 12b or also the securing flange is provided with a large number of holes 13 through which studs 14 of the adjacent container body 3 extend.

The container body 3 which is provided with studs 14 also comprises a bar 12a, 12b on which the studs 14 are integrally formed. In the embodiment illustrated, the studs 14 are inserted from above into the holes 13 of the bar 12a and they extend in the illustrated position of the container bodies 3 on the bar 12b in a downward direction; of course, the configuration may also be such that the studs 14 on the bar 12b extend upwards and the container body with the bar 12a is placed from above on the studs 14.

In place of studs 14 which are integrally formed on the container body 3, there may also be provision for each of the container bodies 3 to comprise a bar 12a, 12b with holes 13, for the container bodies 3 to be arranged in such a manner that the holes provided in the bars 12a, 12b are orientated so as to be in alignment with each other and for studs to be provided as separate structural components extending through the holes 13.

The studs 14 each have a desired breaking location so that they can tear off in the manner of shear bolts.

FIGS. 8a to 8c again illustrate variants of container body portions 2 which have been connected to form a multi-chamber container 1 and between which there extends in each case a material bridge 5 which is provided with a desired breaking line 4.

In the variant according to FIG. 8a, the desired breaking line 4 comprises a substantially diagonally extending perforation line 16. In the variant according to FIG. 8b, the perforation line is orientated substantially parallel with the extent of the side walls 6.

In the variant of the multi-chamber container 1 according to FIG. 8c, in a material bridge 5 between the container body portions 2 a film-like hinge 15 is provided in the form of a strip of thinner wall thickness.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A motor vehicle operating fluid container made of plastics material, which comprises at least two chambers which as separate volumes are not in fluid connection with each other and which are each constructed to receive an operating fluid selected from a group comprising fuel, lubricant, coolant, cleaning fluid, reducing agent for the exhaust gas denitrification or fuel additive, wherein at least two surrounding walls of the chambers adjoin each other, the chambers are a component of a coherent container body assembly;
   wherein the surrounding walls of at least two mutually adjacent chambers are connected to each other in a materially integral manner by at least one material bridge including a predetermined breaking line; and
   wherein the connection is constructed to be self-releasing along the predetermined breaking line under the action of deformation forces resulting from an impact so that the container body assembly under the action of deformation forces resulting from an impact is divided along the predetermined breaking line into at least two separate container body portions or container bodies, each of which is configured to maintain fluid therein, and not leak, subsequent to separation of the container body portions or container bodies at the predetermined breaking line.

2. The motor vehicle operating fluid container as claimed in claim 1, wherein the container body assembly comprises at least two container body portions which are integrally connected to each other and which are connected to each other along a predetermined breaking line.

3. The motor vehicle operating fluid container as claimed in claim 2, wherein the container body portions are connected to each other by means of at least one material bridge which is provided with at least one perforation line.

4. The motor vehicle operating fluid container as claimed in claim 2, wherein the container body portions are connected to each other by means of at least one material bridge which is constructed as a film-like hinge.

5. The motor vehicle operating fluid container as claimed in claim 2, wherein the container body portions are connected to each other by means of at least one material bridge which comprises a brittle material which preferably has a greater elasticity modulus than the material of the container body portions.

6. The motor vehicle operating fluid container as claimed in claim 1 wherein the container body assembly is composed in several parts from two or more container bodies.

7. The motor vehicle operating fluid container as claimed in claim 1, wherein the multi-chamber container is formed from thermoplastic plastics material.

8. A motor vehicle operating fluid container made of plastics material, which comprises at least two chambers which as separate volumes are not in fluid connection with each other and which are each constructed to receive an operating fluid selected from a group comprising fuel, lubricant, coolant, cleaning fluid, reducing agent for the exhaust gas denitrification or fuel additive;
   wherein at least two surrounding walls of the chambers adjoin each other, the chambers are a component of a coherent container body assembly;
   wherein the surrounding walls of at least two mutually adjacent chambers are connected to each other in a positive-locking manner or by securing means along a predetermined breaking line; and
   wherein the connection is constructed to be self-releasing along the predetermined breaking line under the action of deformation forces resulting from an impact so that the container body assembly under the action of deformation forces resulting from an impact is divided along the predetermined breaking line into at least two separate container body portions or container bodies, each of which is configured to maintain fluid therein, and not leak, subsequent to separation of the container body portions or container bodies at the predetermined breaking line.

9. A motor vehicle operating fluid container comprising:
   two chambers, each of which has a surrounding wall defining separate volumes that are not in fluid communication with each other, each one of the two chambers is constructed to receive an operating fluid selected from a group comprising fuel, lubricant, coolant, cleaning fluid, reducing agent for exhaust gas denitrification, or a fuel additive; and
   a material bridge integral with the surrounding walls and connecting the surrounding walls of the two chambers together in a materially integral manner, the material bridge including a predetermined breaking line;
   wherein the connection provided by the material bridge is self-releasing along the predetermined breaking line under the action of deformation forces resulting from an impact so that the fluid container under the action of deformation forces resulting from an impact is divided along the predetermined breaking line into the two chambers, each of which is configured to maintain fluid therein and not leak subsequent to separation of the two chambers at the predetermined breaking line.

* * * * *